Nov. 25, 1969    CHARLES T. HSU ET AL    3,480,025
FLOW DIVIDER
Filed May 26, 1966
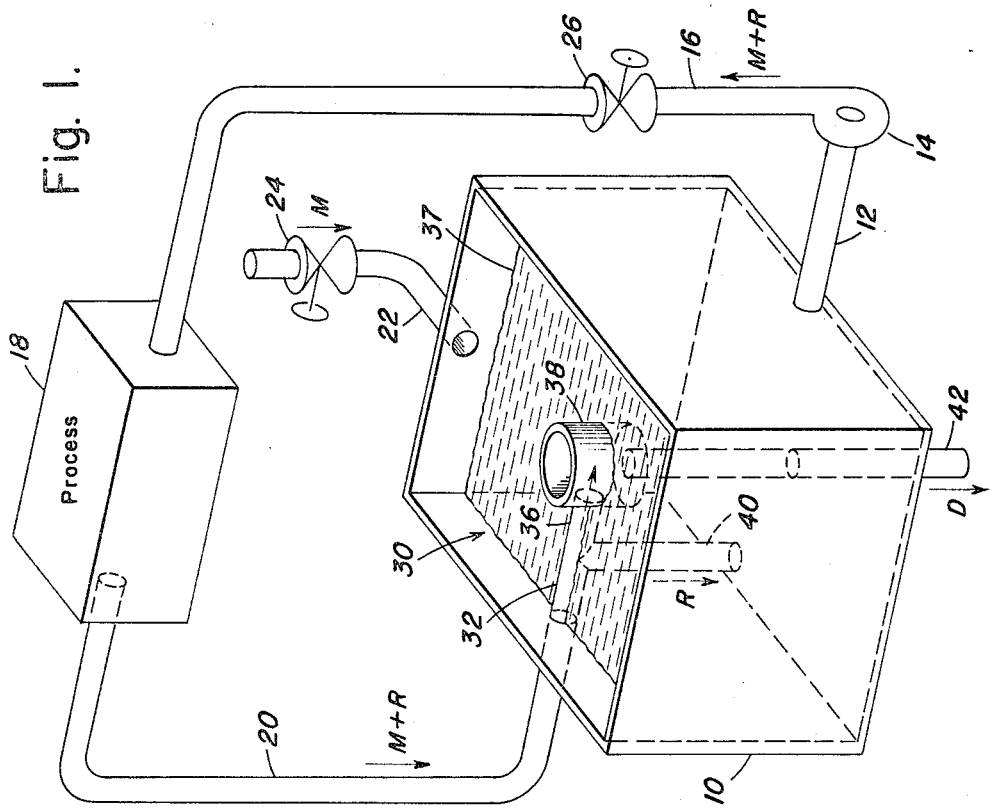
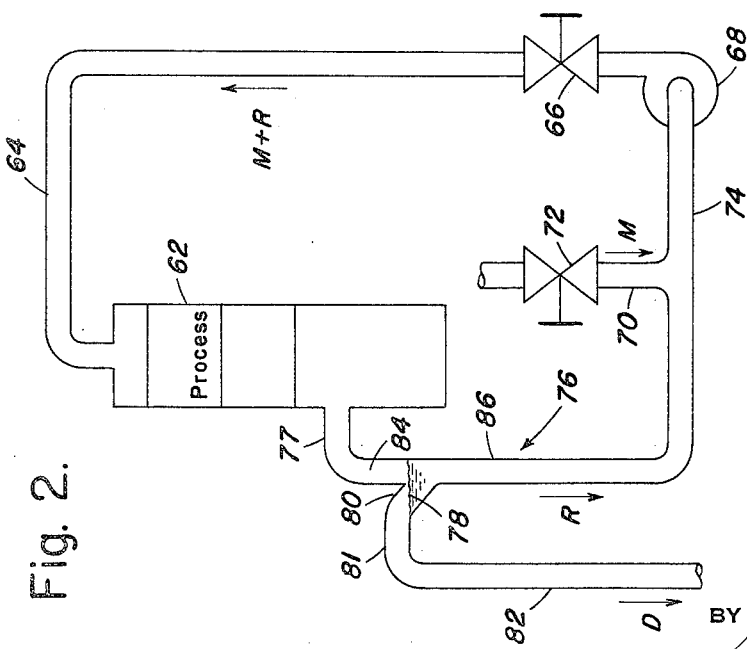
INVENTORS
Charles T. Hsu
Geoffrey Hamer
BY Sheldon H. Parker
ATTORNEY

United States Patent Office 3,480,025
Patented Nov. 25, 1969

3,480,025
FLOW DIVIDER
Charles T. Hsu, Edison, and Geoffrey Hamer, Metuchen, N.J., assignors to American Standard Inc., New York, N.Y., a corporation of Delaware
Filed May 26, 1966, Ser. No. 553,239
Int. Cl. E03b *1/00, 7/07;* F16k *21/18*
U.S. Cl. 137—2                          2 Claims

ABSTRACT OF THE DISCLOSURE

A flow recirculation system consisting of means for circulating a liquid to a process to be served by the system; a reservoir in the system for the recirculation liquid; means to supply the system with make-up liquid; and a flow divided means formed with an inlet passageway to receive the liquid from the process, and with a discharge passageway and recirculation passageway both in communication with the inlet passageway, the recirculation passageway being in communication with the liquid in the reservoir at a position below the normal liquid level in the reservoir whereby fluid in the reservoir seeks its own level in the recirculation passageway such that higher liquid levels in the reservoir and in the recirculation passageway divert greater amounts of liquid to the discharge passageway.

---

This invention relates to an improved method and apparatus functioning to provide desired recycling fluid to a process independent of variations in the amount of make-up fluid. Frequently, in processes requiring a fluid to be recirculated therethrough, it is desired to add make-up fluid to the cycling fluid, for example, to add chemicals to the fluid being circulated or to remove undesired constituents by diluting the fluid flowing through the precess.

Heretofore feed-back type controls have been used in order to regulate the circulating pump output in relationship to the rate of flow of make-up fluid. This approach requires expensive control equipment and at the same time increases the risk of flooding or draining of the process when the control system malfunctions. According to the present invention, the requirement for expensive control equipment is eliminated and variations of liquid level are utilized to provide the desired control.

Accordingly, it is an object of this invention to provide an improved, simple inexpensive and reliable system functioning to provide the desired recycling fluid to a process regardless of the variations in flow rate of a make-up fluid.

Another object is to provide an improved system functioning to provide sufficient recycling fluid to a process to equal the difference between the make-up fluid and the pumping rate of the pump supplying fluid to the process.

For a better understanding of the present invention reference should be had to the accompanying drawings wherein like numerals of reference indicate similar parts throughout the several views and wherein:

FIGURE 1 is a schematic view of a flow divider according to this invention.

FIGURE 2 is a modified form of a flow divider according to this invention.

Referring to FIGURE 1 of the drawings, there is shown a tank 10 connected by pipe 12 to a motorized fluid pump 14 which supplies through a pipe 16 the process 18 to be served. Fluid is returned from the process 18 to the tank 10 through a pipe 20. Additive or make-up fluid may be supplied to the system at any desired location depending upon the specific nature and characteristics of the system. In the drawings make-up fluid is shown as being supplied to the tank 10 from a source indicated by pipe 22 in which a valve 24 is indicated.

Control of the rate of circulation of fluid to the process 18 may be accomplished by any suitable means as by controlling the speed of pump 14 or by adjusting a valve 26 in the discharge line 16 from the pump 14.

In order to provide a sufficient flow of recycle fluid to the pump 14 regardless of the variations in make-up fluid flowing through conduit 22, a flow divider indicated generally at 30 is provided. The flow divider 30 is shown in FIG. 1 as comprising T having an inlet leg 32 communicating with the inlet conduit 20, a discharge leg 36 and a recirculating passageway 40. The flow divider 30 is positioned in the tank 10 with its legs 32 and 36 substantially at the desired fluid level of the tank 10.

The discharge leg 36 communicates with a container 38 disposed within the tank 10 and having its upper edge terminating above the normal fluid level 37 in the tank 10. The container 38 is in communication with a conduit 42 running from the bottom of the container 38 and carrying fluid in the container 38 to discharge. Thus the fluid flowing into the container 38 and through conduit 42 is not recycled to the process 18. The recirculating passageway 40 is directed downwardly into the tank 10 well below the normal operating level 37 of the fluid.

As indicated in the drawings additive or make-up fluid M is supplied to the tank 10 through conduit 22. Recirculating fluid, R, is supplied to the tank 10 through pipe 40. The two fluids M plus R are pumped from the tank 10 to the process 18 by the pump 14. It will be observed that the fluid flowing in the intake leg 32 may flow through either or both conduits 36 or 40. If the fluid level in tank 10 is below the lower free end of conduit 40, the fluid flowing through inlet leg 32 will pass through passageway 40 and into the tank 10 tending to reestablish the desired level 37. As a result the level of fluid in the tank 10 rises, and the fluid tends to seek its level in the conduit 40 thereby filling the lower portion of the conduit 40 and creating a greater resistance to flow therethrough with the result that an increasing portion of the fluid now moves through passage 36 and is discharged from the system via the container 38 and conduit 42.

Thus the tank 10 begins to fill at a decreasing rate as less and less water flows to the conduit 40 due to the back pressure created by the filling of the tank 10 and conduit 40 and more and more water is discharged through conduit 36. It will be observed, therefore, that the level of fluid in the tank 10 controls the rate of flow through conduit 40 relative to the rate of flow through conduit 36. It will be further observed that the level of fluid in tank 10 is affected by the incoming make-up flow through line 22. Thus greater flows of make-up through line 22 will tend to increase the level in the tank 10 thereby creating a greater back pressure in conduit 40 and diverting more fluid to discharge via conduit 36. As the flow to the process 18 reaches a steady state, a generally constant flow of fluid will be required. When this occurs the discharge through conduit 40 will be equal to the make-up fluid in conduit 22. Thus with the system stabilized, it will be seen that if the make-up flow through conduit 22 is increased the water level in the tank 10 will tend to rise increasing the back pressure in conduit 40 and diverting more water through conduit 36 to discharge until the system again becomes balanced so that the increased make-up through conduit 22 balances the increased discharge through conduit 36. Similarly, if the make-up of flow is decreased, the water level in tank 10 would tend to lower so that there is less back pressure in conduit 40 and more water will flow from the intake leg 32 to the conduit 40 thereby tending to increase the level in the tank 10 until the decreased make-up, through conduit 22 matches the decreased discharge through conduit 40. It will be observed therefore that regardless of the make-up flow M, there will always be maintained a sufficient supply of fluid in the tank 10 and the recycle flow R through the conduit 40 will always be equal to the difference between the make-up flow rate M and the flow rate to the pump 14.

If the make-up flow is stopped, for example due to a malfunctioning, no harmful draining or drying of the process will occur because the cutoff of make-up fluid will tend to lower the level of fluid in tank 10 so that all the fluid entering the inlet leg 32 will flow through conduit 40 into the tank 10 attempting to restore the liquid level while the flow through conduit 36 will be zero. Thus all the process cycling fluid will flow into the tank 10 via conduit 40 to be continuously recirculated through the process 18 to keep the latter wet. This feature is important in certain applications such as in packed towers (e.g. trickle filters, cooling towers, etc.) and similar equipment where drying of the process may create a fire hazard or other difficulties. If the make-up fluid M should unexpectedly increase, no harmful flooding will occur since the resulting increase in the liquid level of tank 10 will create a greater divergence of fluid flow through conduit 36 to discharge.

It will be observed that the flow divider 30 has no moving parts and no control means beyond its inherent design and that it continuously, automatically and in varying measure as required, works to provide the desired recycling fluid regardless of the amount of make-up. It eliminates the possibility of harmful flooding and of the process going dry. The system is relatively inexpensive, simple and reliable and there are no controls to develop malfunctions. It is also to be noted that the arrangement tends to maintain a constant suction head on the pump 14 and to protect the pump from ever running dry.

Referring now to the modified embodiment of FIG. 2, the system is shown therein as comprising a continuous flow fluid circuit in which a process indicated at 62 is supplied through a pipe 64 and valve 66 from a motorized pump 68. Make-up fluid is supplied to the system from pipe 70 having a control valve 72 and directed to pipe 74 supplying fluid to the pump 68 from stand pipe 76 having an upper leg 84 and lower leg 86. Stand pipe 76 is connected by pipe 77 to receive fluid from the process 62. Connected to the stand pipe 76 at substantially the normal stabilized level of fluid level in the stand pipe, is an upwardly inclined discharge pipe 80 through which fluid may be discharged from the system through pipes 81 and 82.

In this modification, the stand pipe 76 acts as a reservoir and the T formed by pipe 76 and pipe 80 acts as a flow divider.

In operation of the system of FIG. 2 recirculation fluid R, and incoming make-up fluid M are passed to the pump 68 from pipes 76 and 70 respectively. The combined fluids R and M are passed from the pump 68 through pipe 64 to the process 62. From the process 62 the combined fluid is passed to the intake upper leg 84 of the stand pipe 76. Thereafter, the fluid is passed to the lower leg 86 of the stand pipe 76 to be recirculated and/or to the discharge passageway 81 depending upon the level of fluid in the stand pipe 76.

Thus, if the fluid level is normal, i.e. at the level indicated at 78, the flow through pipe 77 will pass partly to the recirculation passage 86 and partly to the discharge passageway 81 and the system stabilized wherein the make-up through pipe 70 equals the discharge through pipe 82. When the fluid level falls below normal (for example when the make-up flow rate is reduced) the liquid level in the T will tend to drop and the flow through pipe 77 will pass to the recirculation passageway 86 and begin to restore normal fluid level. Should the fluid level rise above the normal level 78 due to an increase in make-up, an increasing fluid differential head between the fluid level in the stand pipe 76 and the level of discharge pipe 81 is developed thereby progressively increasing the proportion of fluid passed to discharge through pipe 81. This continues until the fluid level is again back to normal and the system is stabilized.

As in the previously described arrangement, the flow divider is responsive to the level of fluid to provide the desired amount of recycle fluid regardless of the amount of make-up.

What is claimed is:

1. A method for use in continuous flow liquid recirculation system of the type including a reservoir, a process connected in series with the reservoir, and means for supplying make-up liquid to said system to variably augment said recirculating liquid, comprising the steps of: collecting, in a confined intake passageway located at a position in said reservoir corresponding to the normal desired level of liquid in said reservoir, the combined fluids discharged from said process; directing a portion of said liquid through a recirculation passageway to an area of said reservoir below the normal fluid level therein to develop a back pressure adjacent said intake passageway dependent upon the level of liquid in said reservoir; and the step of directing the remainder of said liquid flowing through said intake passageway to an area not in liquid communication with said reservoir responsive to the development of said back pressure.

2. A flow recirculation system comprising:
(i) a reservoir for carrying a liquid to be circulated to a process to be serviced by the system;
(ii) a pump being connected to said reservoir and said process to circulate said liquid from the reservoir to the process;
(iii) a flow divider having an inlet passageway, a recirculation passageway and a discharge passageway all of said passageways being interconnected with one another;
(iv) a discharge conduit being connected to said discharge passageway for carrying the liquid away from the system;
(v) said inlet passageway being in communication with the process and thereby carry the liquid from the process to said flow divider;
(vi) said recirculation passageway being located below the normal liquid level in said reservoir and in communication therewith to carry the liquid from said inlet passageway to the reservoir; and
(vii) the amount of flow of said liquid being delivered to the reservoir from said recirculation passageway, and to the discharge conduit from said discharge passageway being responsive to the level of the liquid in said reservoir wherein when the level of liquid in the reservoir is below its normal level more liquid will be delivered to the reservoir and when it is above the normal level more liquid will be delivered to the discharge conduit so as to maintain a constant liquid level in the reservoir.

References Cited

UNITED STATES PATENTS

| 1,768,162 | 6/1930 | Sperr | 137—563 XR |
| 2,830,615 | 4/1958 | Borell et al. | 137—395 XR |
| 2,887,308 | 5/1959 | Sala | 261—36 |
| 3,129,717 | 4/1964 | Main et al. | 137—563 XR |

HENRY T. KLINKSIEK, Primary Examiner

U.S. Cl. X.R.

137—395, 563; 261—36